United States Patent [19]

Nokubo

[11] Patent Number: 5,622,483

[45] Date of Patent: Apr. 22, 1997

[54] MOTOR END COVER LOCATED RESILIENT MOUNT FOR A MOTOR PUMP UNIT

[75] Inventor: Seiji Nokubo, Itami, Japan

[73] Assignee: Sumitomo Electric Industries, Ltd., Osaka, Japan

[21] Appl. No.: 501,574

[22] Filed: Jul. 12, 1995

[30]      Foreign Application Priority Data

Jul. 13, 1994  [JP]  Japan ................................ 6-161042

[51] Int. Cl.⁶ .................................................. F04B 53/16
[52] U.S. Cl. ........................ 417/363; 248/635; 248/638
[58] Field of Search ...................... 417/363, 271,
                  417/423.15, 415; 248/659, 605, 635, 638

[56]            References Cited

U.S. PATENT DOCUMENTS

| | | | |
|---|---|---|---|
| 1,467,233 | 9/1923 | Crumb | 417/423.15 |
| 4,452,417 | 6/1984 | Krafthefer et al. | 248/635 |
| 4,520,987 | 6/1985 | Eguchi et al. | 248/638 |
| 4,594,056 | 6/1986 | Brunner | 417/271 |
| 4,655,099 | 4/1987 | Hansen | 248/638 |

FOREIGN PATENT DOCUMENTS 713321  10/1931  France ...................... 417/363

*Primary Examiner*—Timothy Thorpe
*Assistant Examiner*—Roland G. McAndrews, Jr.
*Attorney, Agent, or Firm*—Wenderoth, Lind & Ponack

[57]            ABSTRACT

A brake fluid pressure controller for use in a motor vehicle having a hydraulic unit. including a housing and a pump mounted in the housing. A motor for driving the pump is coupled to the housing. The hydraulic unit and the motor are mounted through shock-absorbing rubber mount to a vehicle body. The rubber mount is supported on a support portion formed on the end cover of the motor. This eliminates the need for machining and extra parts and reduces the machining cost.

2 Claims, 6 Drawing Sheets

MOTOR END COVER LOCATED RESILIENT MOUNT FOR A MOTOR PUMP UNIT

BACKGROUND OF THE INVENTION

The present invention relates to a brake fluid pressure controller having a motor-driven hydraulic pump necessary for antilock control and/or traction control of vehicle wheels, and more particularly to a fluid pressure controller including shock absorbing means for damping shock transmitted from the controller to the car body.

A brake fluid controller of this type has a motor-driven pump. The pump tends to vibrate rather violently when discharging. In order to prevent pump vibrations from being transmitted to the car body, it was proposed in Unexamined Japanese Utility Model Publication 2-38259 to mount the controller on the car body through shock-absorbing rubber mounts. In the arrangement shown in FIGS. 5A, 5B, all the rubber mounts 10 are mounted on a pump housing 3 of a hydraulic unit 2. In the arrangement shown in FIGS. 6A, 6B, one of the rubber mounts 10 is mounted on a support member 18 welded to a yoke 5 of motor 4.

In the arrangement of FIGS. 5A, 5B, in which all the rubber mounts are mounted on the housing 3, if it is desired to increase the layout density of the parts and fluid passages in the housing 3 in order to reduce the size of the entire brake pressure controller, the space for mounting the rubber mounts will be limited. Thus, it is often necessary to provide such space by machining. Such machining work adds to the manufacturing cost.

For example, the housing 3 of FIG. 5A is formed by extrusion because extruded articles are cheaper and less likely to suffer internal defects than a cast article. This housing has protrusions 3a which are extruded perpendicular to the plane including FIG. 5A. In order to provide the mounting space for the rubber mounts on the motor side, the protrusions 3a have to have a sufficient thickness. Further, in order to prevent such thick protrusions from interfering with the motor 4, the protrusions 3a have to be partially cut away by machining. Such machining work increase up the manufacturing cost.

On the other hand, in the arrangement of FIGS. 6A, 6B, since the rubber mount 10 on the motor side is mounted on the motor, the protrusions 3a need not be so thick. Thus, there is no need for machining work to prevent interference with the motor. But this arrangement requires a support means 18 for supporting the rubber mount. The support means 18 has to be welded to the motor. Such welding work will increases manufacturing cost. Also, the support means 18, provided around the yoke of the motor, may have a bad influence on the magnetizability of the magnet in the yoke and thus the performance of the motor.

An object of the present invention is to solve these problems.

SUMMARY OF THE INVENTION

According to the present invention, there is provided a brake fluid pressure controller for use in a motor vehicle comprising a hydraulic unit having a housing and a pump mounted in the housing, a motor for driving the pump coupled to the housing, the motor having a yoke and an end cover provided at one end of the yoke, and a shock-absorbing rubber mount through which the hydraulic unit and the motor are mounted to a vehicle body. The rubber mount is supported on a support portion formed on the end cover.

The motor has an end cover (bracket) at least at one end thereof to close an end opening of its yoke. According to the present invention, the end cover is provided with a support portion for a rubber mount. The support portion may be in the form of an extension protruding radially outward from the edge of the end cover. With this arrangement, there is no need to additionally machine the housing of the hydraulic unit. Also, there is no need to mount a separate support member by welding. The end cover is usually formed from a sheet metal or an aluminum diecasting, so that the support portion, in the form of, e.g. extension, can be easily formed. Thus, the rubber mount can be mounted at low cost.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1A:
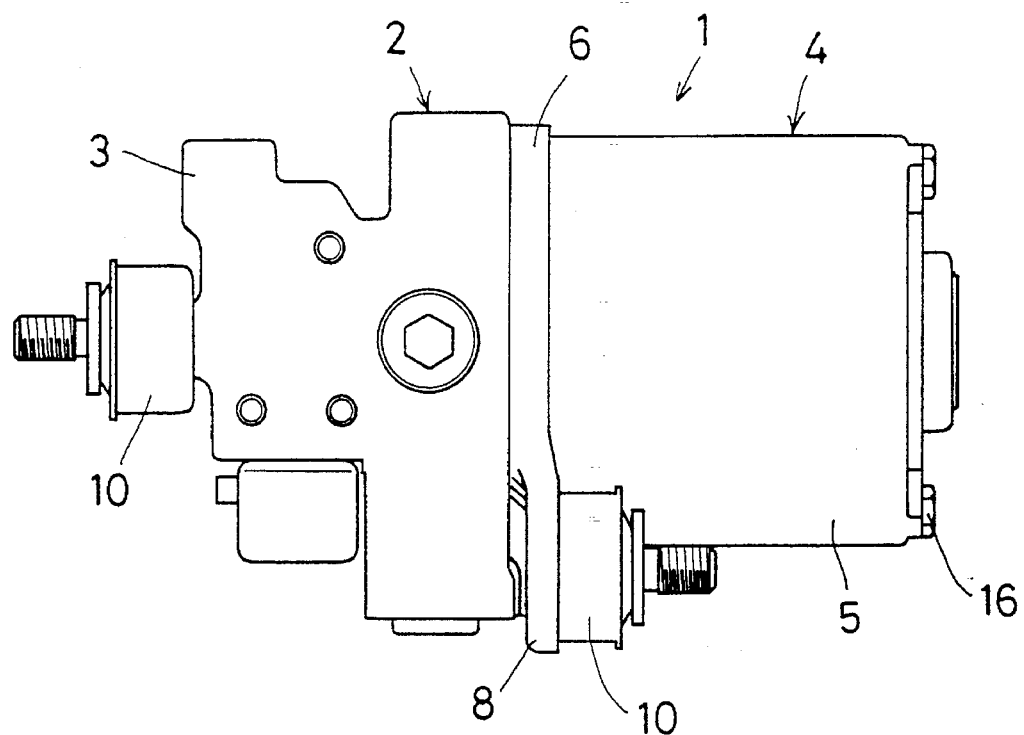
FIG. 1A is a side view of a brake fluid pressure controller of one embodiment according to the present invention.
Figure 1B:
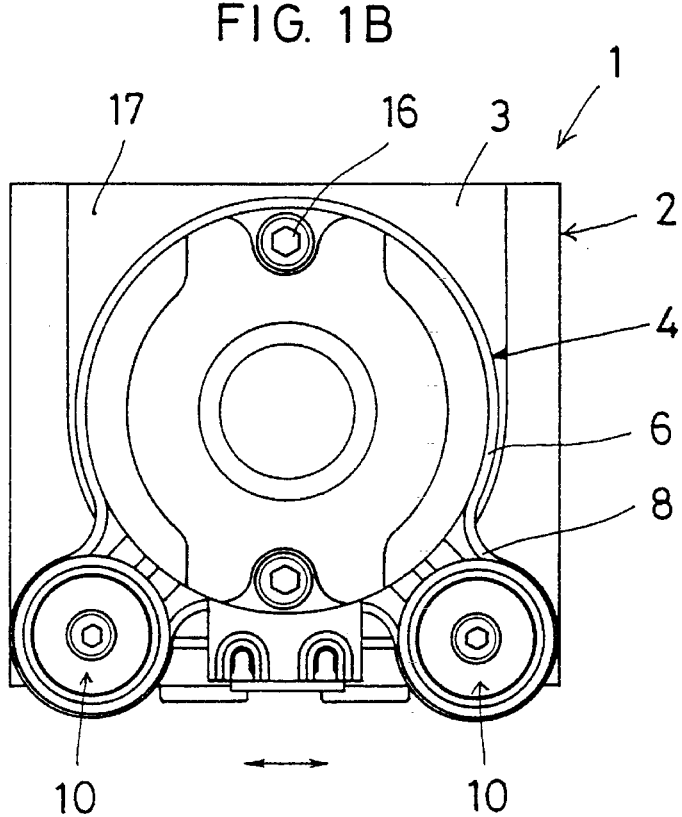
FIG. 1B is a back view of the same.

FIGS. 1A, 1B show an embodiment of the brake pressure controller according to the present invention. The controller 1 of this embodiment has a hydraulic unit 2 and a motor 4 directly coupled to the hydraulic unit.

The hydraulic unit 2 has a hydraulic pump mounted in its housing 3. It further includes fluid passages connecting the master cylinder with wheel brakes, fluid passages connecting wheel brakes with a buffer chamber, a fluid passage connecting the pump discharge port with the master cylinder, and solenoid valves for increasing, holding and reducing the wheel brake pressure by selectively opening and closing the necessary one or ones of the fluid passages. The hydraulic unit 2 is a conventional one and may further include a flow control valve or a buffer chamber in the housing 2. In FIG. 1 and all the other drawings, none of these internal elements are shown.

The motor 4 has its pump-driving output shaft protruding into the housing 2. The motor 4 is coupled to the housing 2 by bolts 16 that extend through a rear end cover, and a space between the cylindrical portion of the yoke 5 and the rotor. The motor 4 shown in FIGS. 1A, 1B has a front end cover 6 having radial extensions 8 each carrying a rubber mount 10 on the motor side.

Figure 2A:
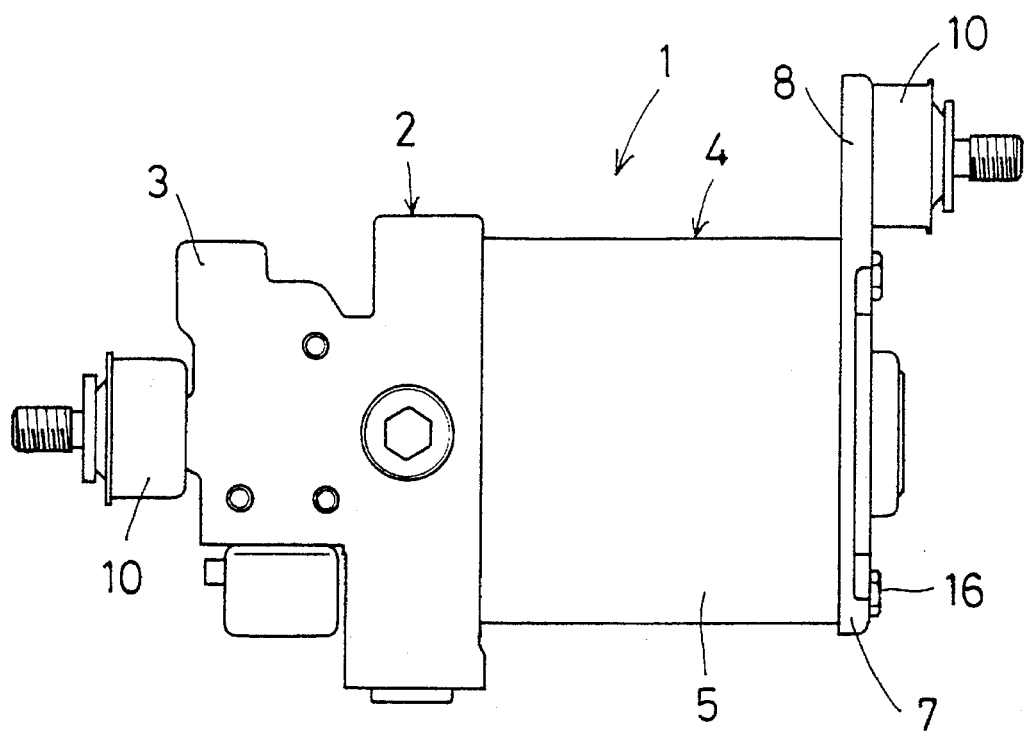
FIG. 2A is a side view of another embodiment.
Figure 2B:
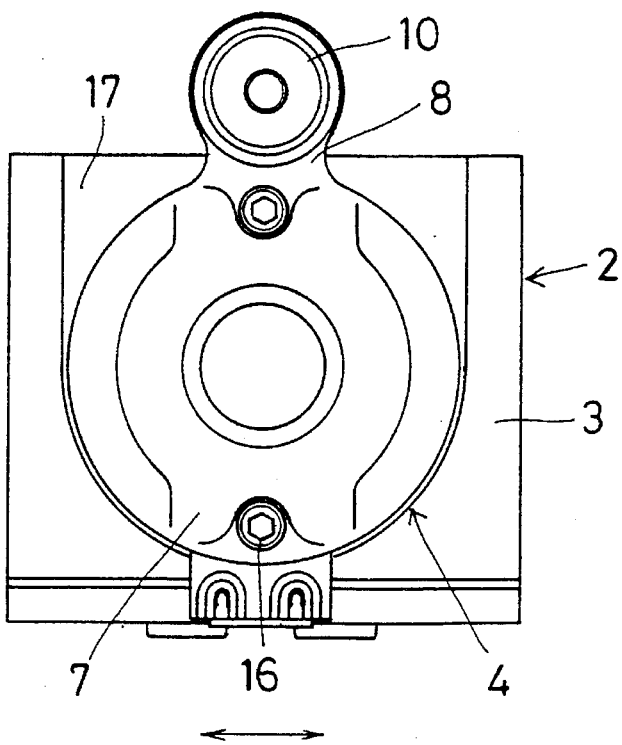
FIG. 2B is a back view of the same.

In the arrangement of FIGS. 2A, 2B, the housing 2 itself serves as the front end cover of the motor 4. Namely, there is no separate front end cover. Thus, in this embodiment, a rubber mount 10 on the motor side is mounted on an extension 8 formed on the rear end cover 7.

Instead of mounting the rubber mount 10 on the extension so as to radially protrude from the outer periphery of the motor, it may be mounted on the outer end face of the rear end cover 7 as shown in FIG. 3. The motor of this embodiment has its yoke 5 and rear end cover 7 formed as a one-piece member, so that it is impossible to form an extension on the end cover. Thus, in this embodiment, the rubber mount is mounted without an extension.

In any of the embodiments, the rubber mount 10 remote from the motor is mounted on the end face of the housing 3 as in the conventional controller. Unlike the rubber mount(s) on the motor side, the mounting space for the rubber mount on this side is fairly large. Thus, there is no need for providing extra mounting space, and thus no increase in manufacturing cost.

Figure 3A:
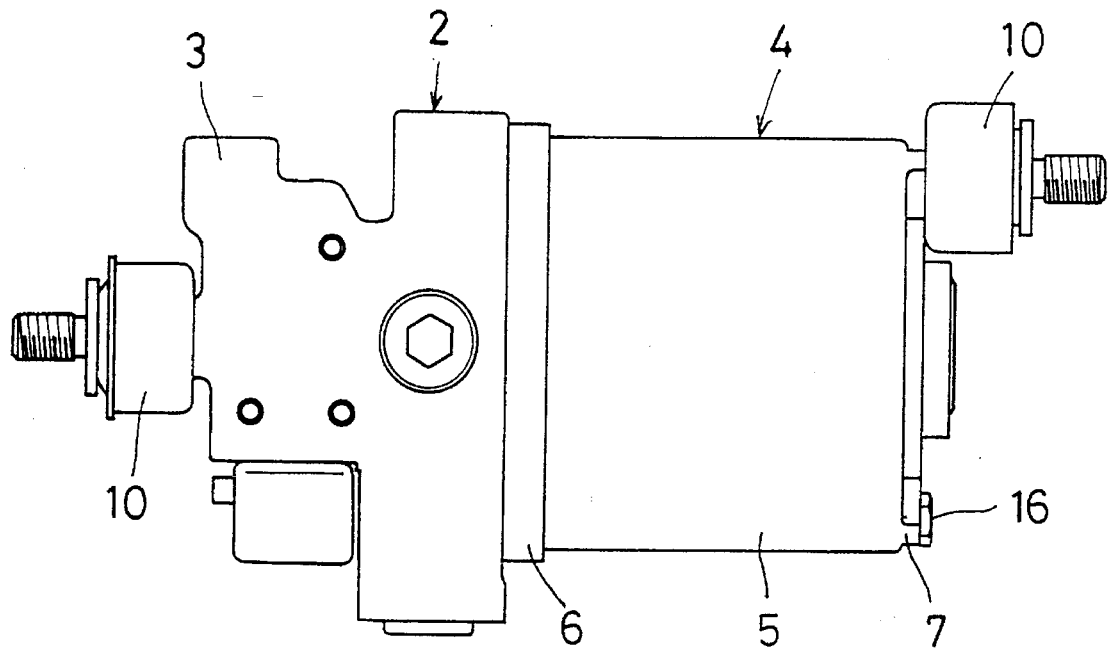
FIG. 3A is a side view of still another embodiment.
Figure 3B:
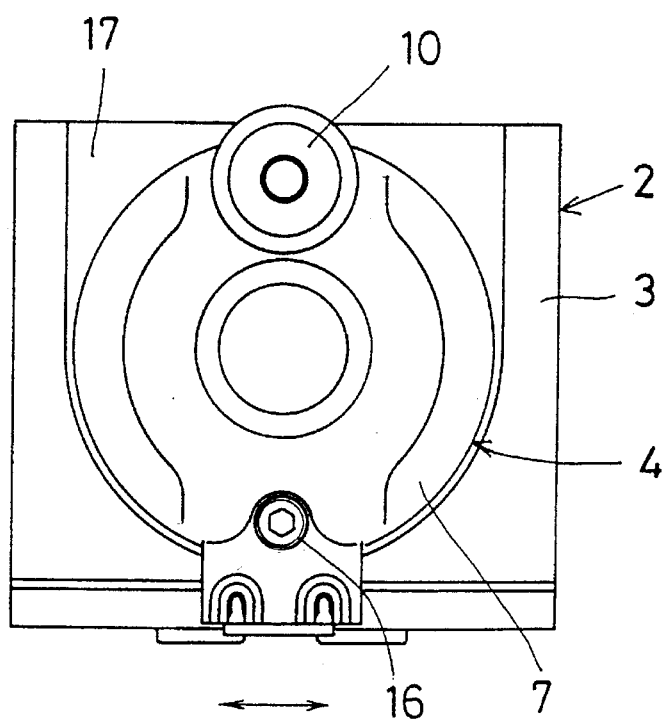
FIG. 3B is a back view of the same.

In any of the embodiments, the housing 3 is formed by extruding a section in the direction of the arrow in FIGS. 1B, 2B and 3B, cutting it to a predetermined length, and forming bores, etc. The housing 3 has a shallow machined recess 17 in one end face thereof to mount the motor therein so as to support it in tight contact with the housing. This recess is also necessary in conventional controllers, and has no influence on the cost for mounting rubber mounts.

Figure 4A:
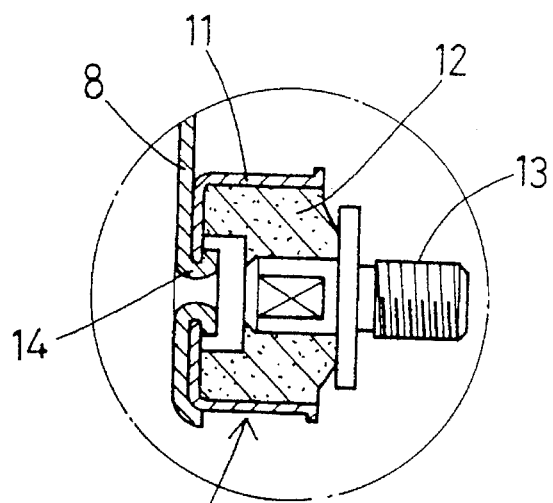
FIG. 4A is a sectional view of a mounting means for mounting a rubber mount.
Figure 4B:
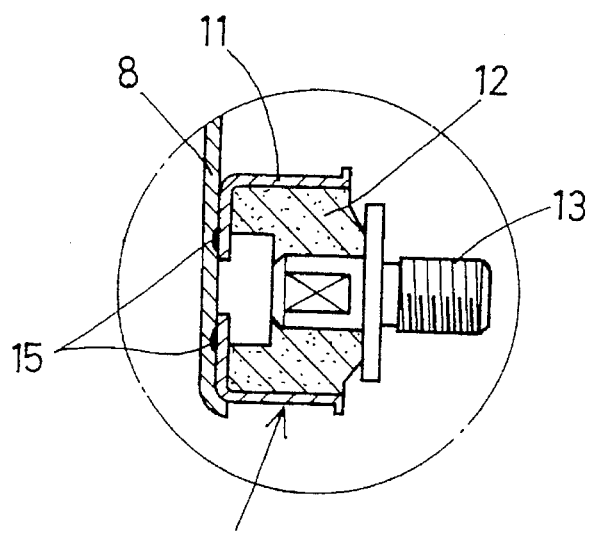
FIG. 4B is a sectional view of another mounting means.
Figure 4C:
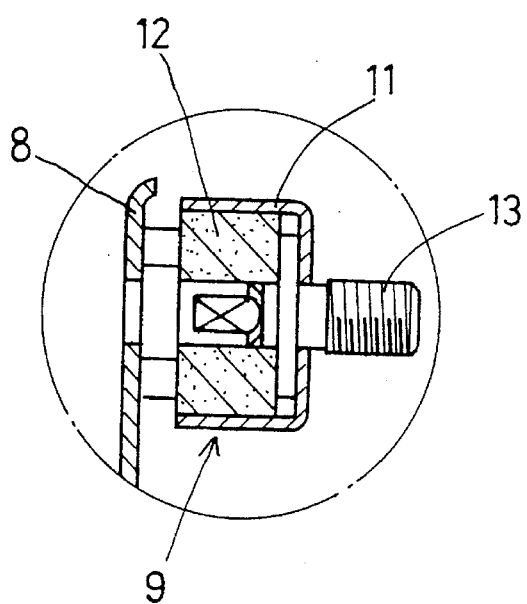
FIG. 4C is a sectional view of still another mounting means.

FIGS. 4A–4C show mounting a means 9 for mounting rubber mount 10 on the end cover 6 or 7. The rubber mounts 10 comprise a cup-shaped case 11, a shock-absorbing rubber member 12 mounted in the case, and a mounting bolt 13 for mounting the rubber mount to the car body. The mounting means 9 shown in FIG. 4A comprises caulked portions 14 formed on the extension 8 of the end cover 6 or 7 and engaging the case 11. The mounting means 9 of FIG. 4B is a welding connection (at 15) between the extension 8 and the case 11 of the rubber mount. The mounting means 9 shown in FIG. 4C is a longitudinally bifurcated mounting bolt 13 having one of its bifurcated legs caulked, welded or otherwise fixed to the extension 8 and the other to the case 11.

The rubber mount 10 of the embodiment in FIGS. 3A, 3B, is also mounted on the outer end face of the rear end cover 7 in the above-described manner.

Figure 5A:
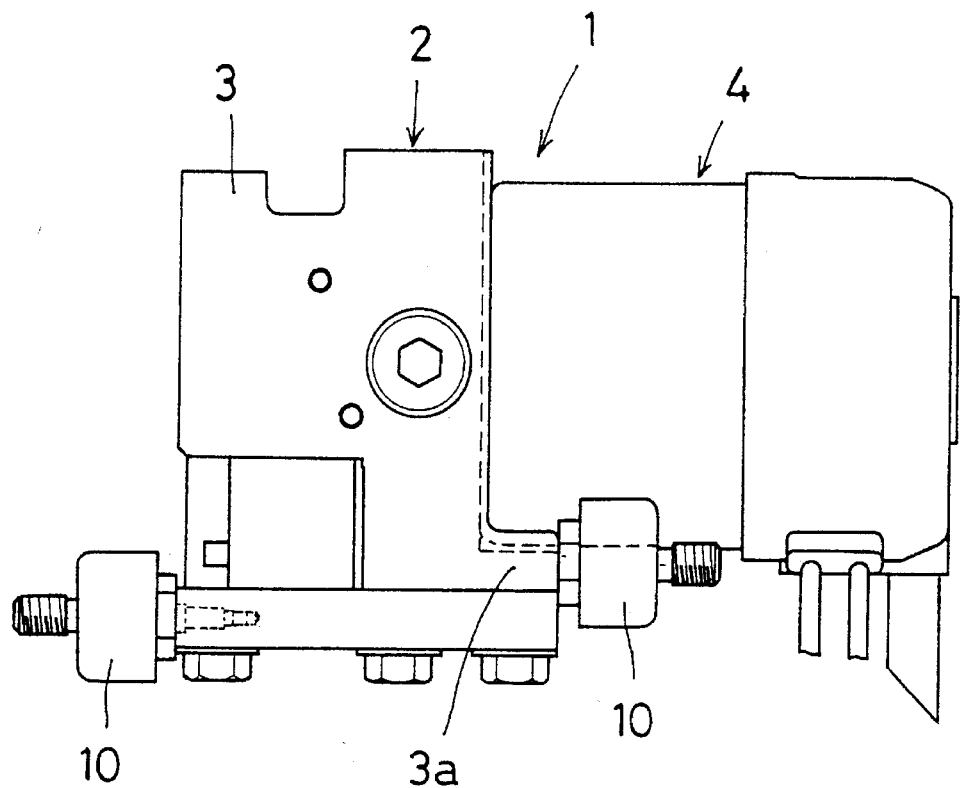
FIG. 5A is a side view of a conventional brake pressure fluid controller.
Figure 5B:
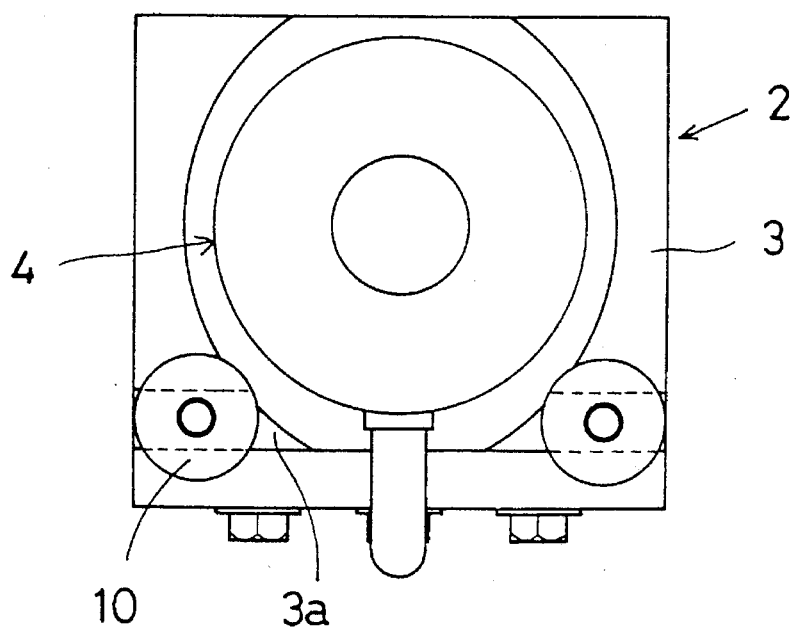
FIG. 5B is a back view of the same.
Figure 6A:
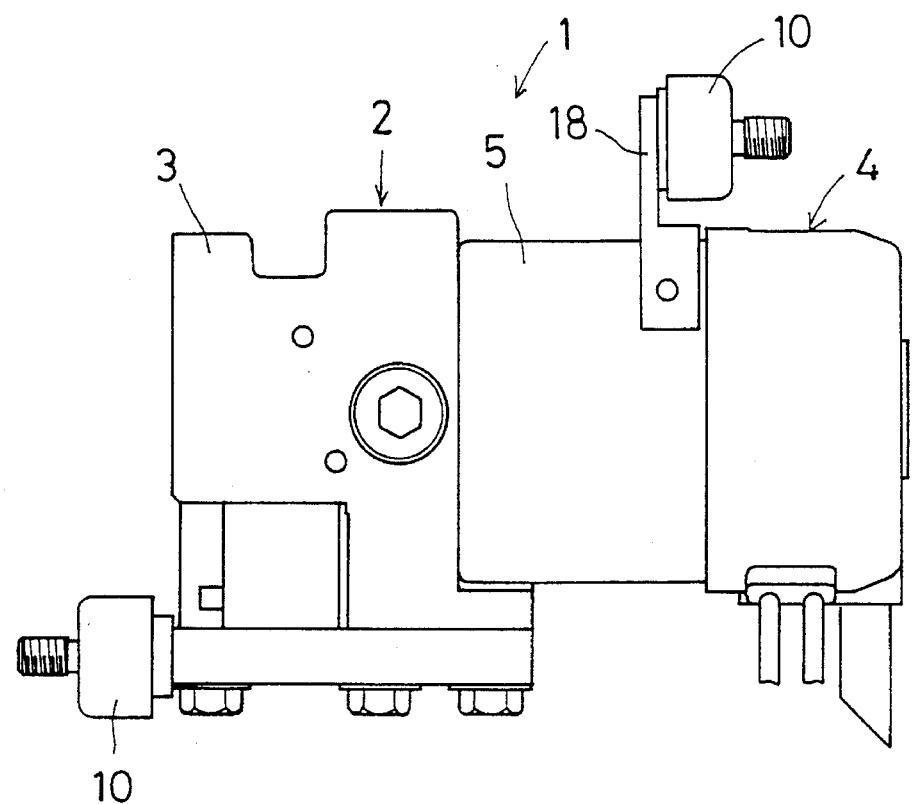
FIG. 6A is a side view of another conventional brake pressure fluid controller.
Figure 6B:
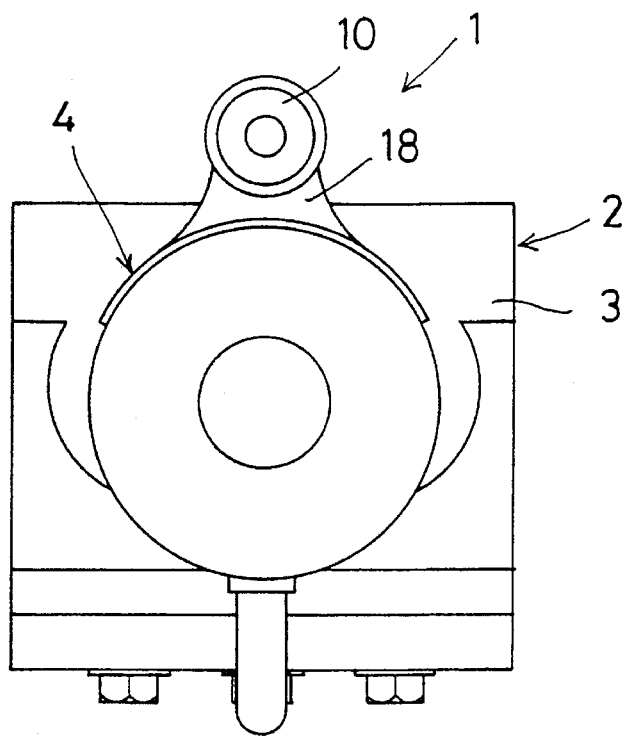
FIG. 6B is a back view of the same.

With this arrangement, neither the protrusions 3a shown in FIG. 5A nor the support member 18 shown in FIG. 6A is necessary to mount the rubber mount(s). Thus, it is possible to mount rubber mounts without the possibility of an increase in the machining cost due to the provision of the protrusions 3a, or increases in the number of parts and assembling cost and a drop in the motor performance due to the provision of the support member 18.

According to the present invention, it is possible to mount shock-absorbing rubber mounts on a brake fluid pressure controller at a low cost while maintaining a high performance of the controller.

Since rubber mounts are mounted on the front or rear end cover, their mounting positions can be determined or changed rather freely.

What is claimed is:

1. A brake fluid pressure controller for use in a motor vehicle, comprising:

a hydraulic unit having a housing and a pump mounted in said housing;

a motor coupled to said housing for driving said pump, said motor comprising a yoke and an end cover at one end of said yoke, and said end cover comprising a support portion formed thereon; and a shock-absorbing rubber mount for mounting said hydraulic unit and said motor to a vehicle body, said rubber mount being supported on said, support portion formed on said end cover;

wherein said motor has a rear end cover and is coupled to said housing by bolts that extend through said rear end cover of said motor.

2. A brake fluid pressure controller for use in a motor vehicle, comprising:

a hydraulic unit comprising a housing;

a motor coupled to said housing of said hydraulic unit, said motor comprising a yoke and an end cover at one end of said yoke, and said end cover comprising a support portion formed thereon; and a shock-absorbing rubber mount for mounting said hydraulic unit and said motor to a vehicle body, said rubber mount being supported on said support portion formed on said end cover;

wherein said motor has a rear end cover and is coupled to said housing by bolts that extend through said rear end cover of said motor.

* * * * *